US006678793B1

United States Patent
Doyle

(10) Patent No.: US 6,678,793 B1
(45) Date of Patent: Jan. 13, 2004

(54) USER-BASED SELECTIVE CACHE CONTENT REPLACEMENT TECHNIQUE

(75) Inventor: Ronald P. Doyle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 09/670,753

(22) Filed: Sep. 27, 2000

(51) Int. Cl.[7] .............................................. G06F 12/00
(52) U.S. Cl. ...................................... 711/133; 709/226
(58) Field of Search ........................... 711/133; 709/216, 709/226; 705/40

(56) References Cited

U.S. PATENT DOCUMENTS 6,154,776 A * 11/2000 Martin ....................... 709/226

OTHER PUBLICATIONS

Kelly et al., "Biased Replacement Policies for Web Caches: Differential Quality-of-Service and Aggregate User Value", 4th Intl Web Caching Workshop, Mar. 24, 1999.*
Chan et al., "One size doesn't fit all: Improving network QoS through preference-driven Web caching", 2nd Berlin Internet Economics Workshop, May 28, 1999.*
Kelly et al. "Variable QoS from Shared Web Caches: User-Centered Design and Value-Sensitive Replacement", Nov. 12, 1999, MIT Workshop on Internet Service Quality Economics.*

* cited by examiner

Primary Examiner—Mano Padmanashan
Assistant Examiner—Paul Baker
(74) Attorney, Agent, or Firm—Jeanine S. Ray-Yarletts; Marcia L. Doubet

(57) ABSTRACT

The present invention provides a method, system, and computer program product for selectively replacing cached content (including, but not limited to, dynamically generated Web pages which have been cached) to provide a higher level of service to particular users or groups of users. Service providers may use the disclosed techniques to justify charging for an enhanced quality of service. The disclosed techniques enable reducing, in many cases, the system overhead and response time required for delivering content to those content requesters who have this type of enhanced service. When content is evaluated for potential caching and the cache is determined to be full, content is selected for overwriting according to the quality of service level of the content owner.

21 Claims, 4 Drawing Sheets

USER-BASED SELECTIVE CACHE CONTENT REPLACEMENT TECHNIQUE

BACKGROUND OF THE INVENTION

1. Field of the Invention

The present invention relates to a computer system, and deals more particularly; with a method, system, and computer program product for selectively replacing cached content (including, but not limited to, dynamically generated Web pages which have been cached) to provide a higher level of service to particular users or groups of users.

2. Description of the Related Art

Techniques a well known for caching static content of files, Web pages, and so forth in order to improve the speed and efficiency of information retrieval, and various efforts are underway to determine suitable caching techniques for dynamically-generated content. For example, when a user in an Internet environment requests delivery of a statically d Web page, the page may be initially retrieved from a remote application server and then cached (i.e. stored) in a data store of the application server, and/or in a store of an edge server or proxy server that is located more closely to the requesting user. (In some cases, the page may also be cached in a data store that is locally accessible to the requester's computing device. This type of local cache is not pertinent to the present invention, and will not be discussed further herein.) Subsequent requests by this user for the same page may be intercepted by a caching system which attempts to retrieve the previously page from the data store. When the page can be retrieved from the cache of an intermediate server, the An overhead of the round trip to the remote server is avoided, thereby improving the system performance and reducing the response time to the user. On the other hand, if the page is not available in the cache of the intermediate system, then it may be available from the cache of the application server. In this latter case, while the length of the network round-trip is not reduced, the system overhead of recreating the page content can be avoided, and the requested content can be returned to the user more quickly as well.

While efforts are ongoing to optimize the usage of caching in Web environments, the focus of these efforts is primarily directed toward determining when cached content should be invalidated and a more current version of the content should therefore be created or fetched. As the popularity of distributed computing (and use of the Internet and Web, in particular) continues to grow, more and more types of personalized services are being offered to users. As one example many Web shopping sites store user profile information, including the user's name, address, shipping preferences, credit card information, and perhaps the items which this user most often likes to purchase. Each time the user returns to this Web site, a personalized page (which welcomes the user by name, for example) is typically presented. The page may also ask if the user wishes to go directly to his pre-stored list of favorite items. Or, page content may be customized based upon a classification or group (hereinafter referred to as a "group", for ease of reference) into which the user falls (such as pages which are displayed in one manner to "members" of some service or subscription, and in another manner to other users.) As another example, some Web services provide page content which is tailored to specific types of end-user devices. If one user requests a Web page from a full-function desktop machine, the page may be delivered with rich media content including graphics and video clips, sound files, animated icons, and so forth. If the same page is requested from a user who is using a limited-function computing device such as a cellular phone or personal digital assistant (PDA), then the same page may be filtered or transcoded prior to delivery to the user, where these processes suppress certain content (such as the sound, video, and animation files) and may reduce the size of the remaining content. As a further example, other criteria such as the type and/or speed of network connection in use by the end-user may be considered in order to provide tailored page content using these same types of filtering and transcoding processes.

As usage of pages that are tailored for particular users, particular target devices, particular connection types and speeds, and other similar criteria continues to grow, the number of pages that are cachable is growing rapidly. Many of these pages may be the result of complex, computationally expensive processes at the application server. Furthermore, the pages may also be based on information that the application server must retrieve from other machines, such as by invoking a legacy host application or accessing a relational database, which significantly increases the amount of processing overhead and the time required to generate the page content. The problem of "thrashing", as cached pages are replaced to make room for other newer pages, only to then discover that the replaced pages are now needed again, may be exhibited in caching systems (in a similar manner to the thrashing that may occur in a poorly-tuned memory page replacement system). Because of the added time and expense required for recreating page content for pages that cannot be retrieved from the cache, the advantages to be realized by a well-tuned cache replacement policy will become increasingly important, and may serve to distinguish among providers in the ever-more-competitive distributed computing marketplace.

Accordingly, there is a need for improved techniques for replacing cached page content in a distributed computing environment.

SUMMARY OF THE INVENTION

An object of the present invention is to provide an improved technique for replacing cached page content in a distributed computing environment.

It is another object of the present invention to provide this technique to reduce the response time and system overhead required for delivering dynamically-generated Web page content to requesters.

Another object of the present invention is to provide this technique based on an identification of the user whose page is being considered for replacement.

Still another object of the present invention is to provide this technique based on an identification of a group to which a user whose page is being considered for replacement belongs.

Yet another object of the present invention is to provide a cache replacement technique that may be used by service providers to provide enhanced services to particular users and/or groups of users.

A further object of the present invention is to provide a technique that may be used by service providers to justify service-based additional charges for particular users and/or groups of users.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, in a first aspect the present invention provides a computer program product, a system, and a method for selectively replacing cached content. In this aspect, the technique comprises: searching a cache to determine whether a cached entry exists having a lower quality of service than an entry to be cached; and overwriting the existing cached entry with the entry to be cached, when the search successfully locates the existing cached entry. The technique may further comprise discarding the entry to be cached when the search does not successfully locate the existing cached entry.

A first quality of service is preferably associated with a first client or client group for which the cached entry was cached, and a second quality of service is preferably associated with a second client or client group for which the entry to be cached was created. In this case, the search compares the first quality of service and the second quality of service. The first quality of service is preferably stored as an attribute of the cached entry, and the second quality of service is preferably an attribute of the entry to be cached.

In another aspect, the present invention provide a computer program product, system, and method for providing improved delivery of cached content to clients in a computing environment. This technique comprises: receiving a request for content from a client; determining whether a cached version of the requested content exists in a cache store which can be used for responding to the received request, and returning the requested content to the client if so; and generating the requested content, and returning the generated content to the client and attempting to cache the generated content in the cache store for future use otherwise. Attempting to cache the generated content further comprises: searching the cache store to determine whether a cached entry exists having a lower quality of service level than the quality of service level of the generated content; overwriting the existing cached entry with the entry to be cached, when the search successfully locates the existing cached entry; and not overwriting the existing cached entry otherwise.

Values of the quality of service levels are preferably determined by a service provider, based upon fees paid by clients to the service provider. Overwriting the existing cached entry preferably further comprises writing the quality of service level of the generated content into the cache store.

In these aspects, the cached entry and the entry to be cached, as well as the requested content and the generated content, are preferably Web pages.

In another aspect, the present invention provides a method of doing business, comprising the steps of providing one or more enhanced quality of service levels to customers of a service provider; charging a fee for the enhanced quality of service levels; and providing selective replacement of cached content for subscribers who pay the charged fee. Providing the selective replacement further comprises the steps of searching a cache to determine whether a cached entry exists having a lower quality of service than an entry to be cached; and overwriting the existing cached entry with the entry to be cached, when the search successfully locates the existing cached entry.

The present invention will now be described with reference to the following drawings, in which like reference numbers denote the same element throughout.

DESCRIPTION OF THE PREFERRED EMBODIMENT

Figure 1:
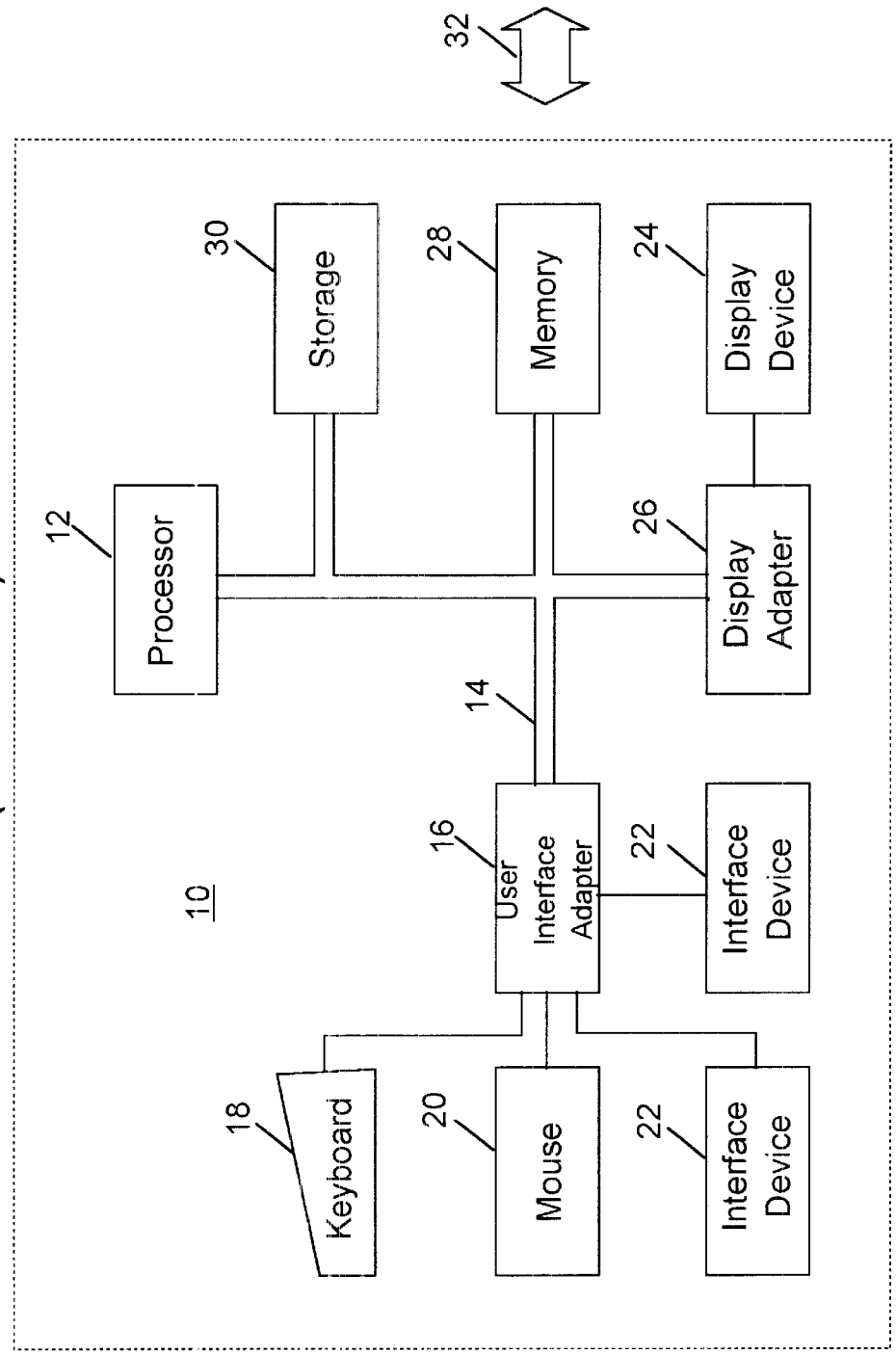
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a LAN or a wide area network (WAN), or the workstation 10 can be a client in a client/server arrangement with another computer, etc. All of these configurations, as well as the appropriate communications hardware and software, are known in the art.

Figure 2:
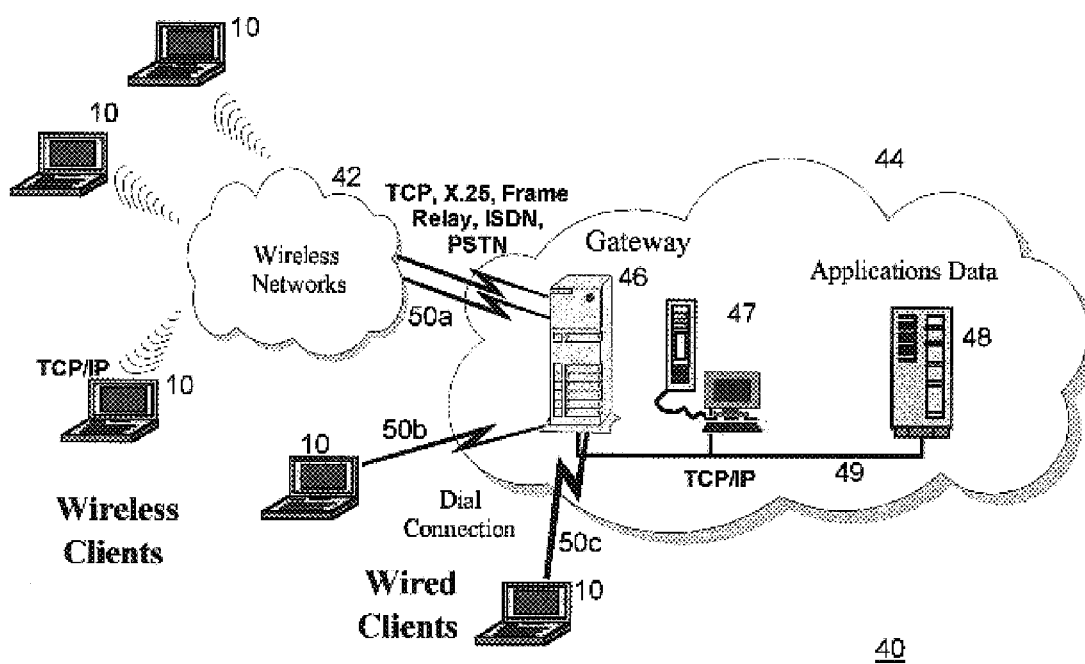
FIG. 2 is a diagram of a networked computing environment in which the present invention may be practiced.

FIG. 2 illustrates a data processing network 40 in which the present invention may be practiced. The data processing network 40 may, include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. Gateway servers may also be referred to as "edge servers", or "proxy servers", as those terms are used herein. The gateway 46 may be coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the server 47 or gateway 46 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiment, the present invention is implemented as one or more modules (also referred to as code subroutines, or "objects" in object-oriented programming), of one or more computer software programs. Preferably, this software operates on a server (such as an application server) or intermediary device (such as an edge server or proxy server) in a network. Or, the software may execute on multiple devices in a distributed manner. (For example, multiple application servers may share cached data in a centralized database, and each such application server may implement the selective cache replacement techniques of the present invention.) An implementation of the present invention may be executing in a Web environment, where a Web server provides services in response to requests transmitted using the HyperText Transfer Protocol (HTTP) from a client connected through the Internet. Alternatively, an implementation of the present invention may be executing in a non-Web environment (using the Internet, a corporate intranet or extranet, or any other network) where cached information is accessed by distributed applications (using techniques such as: Remote Method Invocation, or RMI; IIOP, which is the Internet Inter-ORB Protocol; etc). Configurations for the environment include a client/server network, as well as a multi-tier environment. These environments and configurations are well known in the art.

The preferred embodiment of the present invention will now be discussed in more detail with reference to FIGS. 3 and 4.

The present invention provides a novel technique for selectively replacing cached content. This cache replacement technique may apply to a number of distributed computing environments. For purposes of illustration and not of limitation, the preferred embodiment is described herein in terms of servicing requests for Web page content to be delivered to a requesting client. Note that the requester of page content may, in some cases, be application software. Thus the references herein to a client are intended to include such scenarios, in addition to those in which the requester is an end-user. Furthermore, it should be noted that while the term "page" is used in the drawings and in some references within this text, this is for ease of reference only: the present invention may also be used advantageously with cached (and cachable) content that is structured along another boundary, such as a fragment of a page.

A number of page replacement algorithms have been developed in the prior art for managing memory paging resources in virtual memory operating system environments. Example algorithms include "Least Recently Used", or "LRU"; "LRU with Second Chance"; and so forth. These techniques have been adapted for use with caching page content in distributed computing environments. (However, it should be noted that the term "page" has a different connotation in the virtual memory operating system environment than it does in the Web computing and distributed computing environments, and in particular, the environment to which the present invention is directed.)

The present invention defines improvements upon existing page content caching techniques, which will benefit clients (and in particular, end-users) as well as service providers. Clients will be able to choose an enhanced quality of service (QOS) from a network service provider, or perhaps from an application provider, whereby this client's pages are given preferential treatment during page cache replacement operations. Providers of these enhanced services may choose to charge a higher fee to clients who desire this service. Multiple levels of enhanced quality of service may be provided, if desired, with each higher-priority level requiring payment of a higher fee and giving the client an increased likelihood of having his cached content given prioritized treatment during content replacement operations. Service providers may also use these variable quality of service levels to distinguish themselves from the competition.

Figure 3:
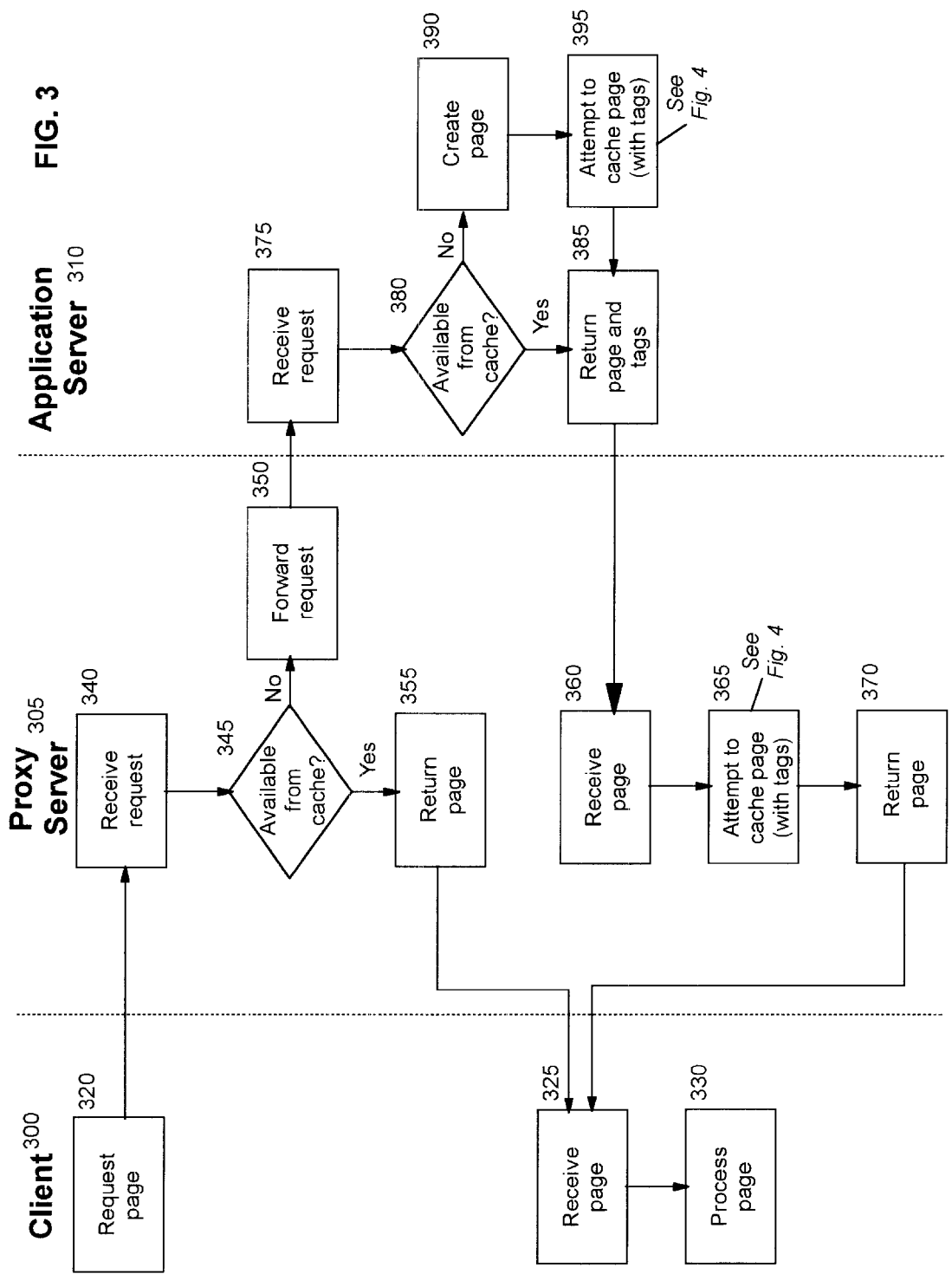
FIG. 3 provides a flowchart showing the logic with which a content request is handled as it flows between network components, according to the present invention.

FIG. 3 depicts the logic with which a request for content is serviced, as the request travels through a network from the requesting client 300 to other network components such as an edge server or proxy server 305 and application server 310. At Block 320, a page or content request is generated by client 300. The request is sent into the network, and received by proxy server 305 (Block 340). If the proxy server maintains its own local cache, or otherwise provides caching services, then a test is made at Block 345 to determine whether a previously-cached version of this content is available. (If proxy server 305 does not provide caching, then Blocks 345, 355, and 365 of FIG. 3 may be omitted. Furthermore, if no proxy server or edge server is encountered in the network path to the application server 310, then the processing of Blocks 340 through 370 is not performed. In addition, it may happen that more than 1 intermediate device which provides caching, such as proxy server 305, is encountered in the network path. In this case, each such intermediate device may perform the logic depicted in Blocks 340 through 370.)

Note a previously-cached version of the requests content may exist, where that content has become stale or invalid according to prior art invalidation criteria. In this case, the test in Block 345 has a negative result. (Similarly, the test in Block 380 has a negative result when this situation is encountered at application server 310.)

If the requested content is available from cache storage (i.e. Block 345 has a positive result), the proxy server 305 simply returns that content (Block 355) to the requester, and the selective cache replacement techniques of the present invention do not need to be invoked for servicing this content request. Upon receiving the returned content (Block 325), client 300 displays the content or performs other content-specific processing (Block 330) using techniques which do not form part of the present invention. The processing of FIG. 3 for this content request then ends.

If the requested content is not available from cache storage (i.e. Block 345 has a negative result), then proxy server 305 forwards the content request (Block 350) to the target application server 310. Upon receiving this request at Block 375, the application server checks (Block 380) for a previously-cached version of the content. If the requested content is found in cache, the content is returned (Block 385) to the proxy server. Preferably, additional information, which is referred to herein as one or more attributes or "tags", is included along with this returned content. The tags are used, according to the present invention, to identify the requester with which this content is associated. (As an alternative to forwarding the tag information at Block 385, the proxy server 305 may independently obtain this information. Refer to the discussion of FIG. 4 for more information.) Preferably, one or more predetermined keywords are used to denote the presence of a tag, and a value is then specified for each such tag. The tag values may specify a particular user, a user group, and so forth which is associated with this content. For example, a tag such as <OWNER> may be specified, having a value of "Mary Smith" or "mary_smith@rnyISP.com" to denote an end-user. Or, as an example of associating content with a user group, a tag might be "[GROUP]" while the tag value might be "Department_ABC". An additional tag and tag value is preferably associated with each cached entry to denote its quality of service. Numeric values may be used to indicate which quality of service a particular client has paid for. For example, if end-user Mary Smith has a QOS level of "3", while the group "Department ABC" has a QOS level of 1, the tags and values might be "QOS=3" and "QOS=1", respectively. (The syntax which is used to denote tags and tag values within cached entries may vary, and the examples shown here are merely illustrative.)

When the test in Block 380 has a negative result, control reaches Block 390 where the application server recreates the content using application-specific techniques. At Block 395, the recreated content is then evaluated for storing in the cache used by the application server, as will be described in more detail below with reference to FIG. 4. The tags to be associated with the cached content are used in this process, as will also be described in more detail below. After the content has been cached (or, alternatively, prior to or contemporaneously with caching the content), the application server returns the recreated content and its tags by transferring control from Block 395 to Block 385.

Block 360 is reached when the application server returns the requested content and its tags to the proxy server, and that content is received. If the proxy server provides caching services, then the content is evaluated at Block 365 to determine whether it should be cached, as described with reference to FIG. 4. The content is also returned to the requesting client (Block 370), where it is processed as previously described with reference to Blocks 325 and 330. (As with the processing of Blocks 385 and 395 at the application server, the ordering of Blocks 365 and 370 at the proxy server is not required to be in the shown.)

Figure 4:
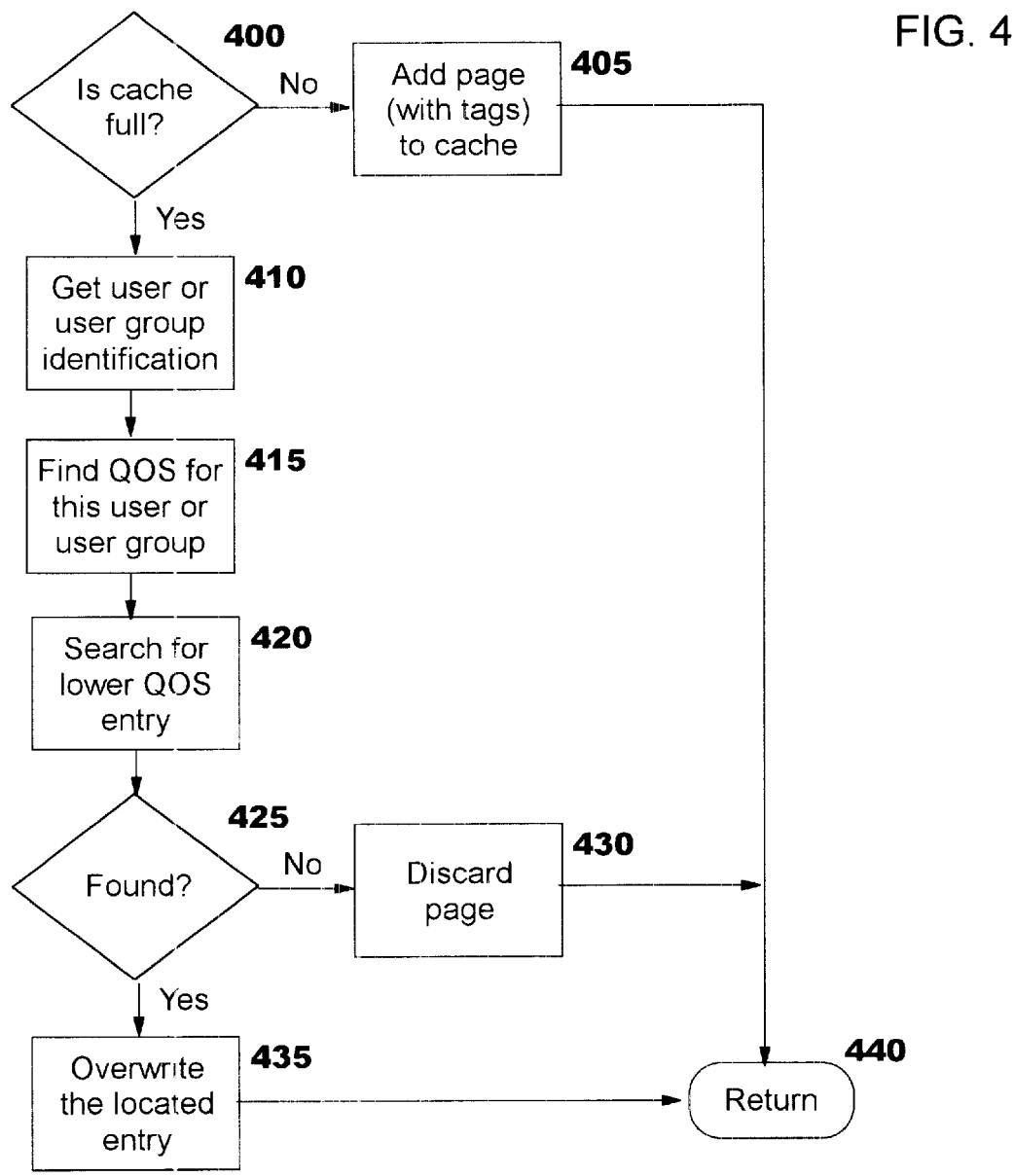
FIG. 4 illustrates a flow chart which sets forth the logic which may be used to implement a preferred embodiment of the selective cache replacement technique of the present invention.

FIG. 4 depicts the logic that may be used by the preferred embodiment of the present invention to provide selective cache replacement for particular content.

Block 400 checks to see if the cache (i.e., the cache accessible to the proxy server, when invoked from Block 365, or to the application server, when invoked from Block 395) is full. If not, then the current content is cached, along with the tags and tag values, at Block 405. The processing of FIG. 4 then ends (Block 440) and returns control to the invoking logic.

When the cache is full, processing reaches Block 410 where the identification of the requesting client (e.g. user or user group) is obtained. Preferably, this information is retrieved from the header of the request message, where it will have been stored according to the prior art. Block 415 then obtains the quality of service level associated with this client. In the preferred embodiment, this information will be found by accessing information previously stored by the provider, and configuration data may be used to determine where the information is located. A default value is preferably used when no previously-stored QOS information for this client is located, where the default is equivalent to the lowest priority provided for this caching system (i.e. the caching system of the proxy server or application server, as appropriate to this invocation of FIG. 4), in order to maintain compatibility with caching systems and service providers that do not support the QOS levels of the present invention.

When the logic of FIG. 4 is invoked from an intermediate device such as proxy server 305, the tags and tag values may have already been determined by application server 310 and forwarded with the content (as shown at Block 385 of FIG. 3). In this case, the processing of Blocks 410 and 415 can be bypassed.

The cache is searched (Block 420) for an existing cache entry representing a lower quality of service than the current content to be cached. A hashing technique may be used, if desired, to enable quickly locating cached content based on tag values. For example, if the QOS level of the current content is 3, and service levels of lower numeric value are given higher priority, then the hashing technique is used to determine whether any already-cached content has a value of 4 or greater. The test in Block 425 asks whether a cache entry with a lower QOS was found. If not, then the current content cannot be added to the cache using the strategy of the present invention. The current content is then preferably discarded (Block 430), and the processing of FIG. 4 exits (Block 440).

When a cache entry with a lower QOS was found, control reaches Block 435. The lower-quality-of-service cached entry is therefore replaced with the current content (including its tags and tag values), and the processing of FIG. 4 then ends (Block 440).

In an optional enhancement of the preferred embodiment (not shown in FIG. 4), each user (or user group) may be allowed to specify multiple levels for particular content within their enhanced level of service. For example, a user may specify that his preferred home page has a higher QOS (and is therefore more readily available from cache) than other pages that he uses less frequently. In this case, the processing of Block 435 is preferably preceded by an additional check to determine whether any previously-cached content for this user (or user group) exists in the cache and has a lower-priority QOS level than the current con tent. If so, then that content is preferably replaced by the current content.

Service providers may charge their users according to a graduated pricing policy when the techniques of the present invention are used. Statistics may be accumulated to justify the increased charge, if desired, for example by accumulating a count of the number of times Block 435 is executed for each user to cause his content to take priority over other already-cached content. Or, conversely, a count may be accumulated of the number of times this user's content is "protected" from being overwritten in the cache by a lower-level content caching request when the test in Block 425 has a negative result. Multiple quality of service levels may be defined, as stated earlier, where each higher level is available at a higher charge to give the user an increased likelihood of having his pages cached (according to the processing in Blocks 410 through 435). Pricing structures may be based solely on the quality of service level, or may also account for the number of times the user's content is given prioritized handling (e.g. using an accumulated count, as described above).

As has been demonstrated, the selective cache replacement technique of the present invention enables providing enhanced services to clients wherein the client's cached (and cachable) content is given prioritized treatment to enable returning requested content to the client more quickly. The disclosed techniques will also be beneficial to the providers who service content requests, as these providers will now be able to provide better services to their clients who choose this enhancement, giving the provider a competitive advantage as well as a justification for charging higher service fees. Methods of doing business by the provider are facilitated using the techniques of the present invention, wherein an enhanced quality of service is provided to clients at an additional charge.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. A computer program product for selectively replacing cached content in a computing environment, the computer program product embodied on one or more computer-readable media and comprising:

computer-readable program code means for searching a cache to determine whether a cached entry exists having a lower quality of service level than an entry to be cached, wherein a first quality of service level associated with the cached entry is either a default quality of service level or is determined according to a client or client group for which the cached entry was cached, and a second quality of service level associated with the entry to be cached is determined according to the client or client group for which the entry to be cached was created, and wherein the computer-readable program code means for searching compares the first quality of service level and the second quality of service level; and computer-readable program code means for overwriting the existing cached entry with the entry to be cached, when the computer-readable program code means for searching successfully locates the existing cached entry having the lower quality of service level, and for discarding the entry to be cached when the computer-readable program code means for searching does not successfully locate the existing cached entry having the lower quality of service level.

2. The computer program product according to claim 1, wherein the first quality of service level is stored as an attribute of the cached entry, and the second quality of service level is an attribute of the entry to be cached.

3. The computer program product according to claim 1, wherein the cached entry and the entry to be cached are Web pages.

4. A computer program product for providing improved delivery of cached content to clients in a computing environment, the computer program product embodied on one or more computer-readable media and comprising:

computer-readable program code means for receiving a request for content from a client;

computer-readable program code means for determining whether a cached version of the requested content exists in a cache store which can be used for responding to the received request, and for returning the requested content to the client if so; and computer-readable prr code means for generating the requested content, and for returning the generated content to the client and attempting to cache the generated content in the cache store for future use otherwise, further comprising:

computer-readable program code means for searching the cache store to determine whether a cached entry exists having a lower quality of service level than the quality of service level of the generated content, wherein values of the quality of service levels are determined by a service provider, based upon fees paid by clients to the service provider;

computer-readable program code means for overwriting the existing cached entry with the generated content, when the computer-readable program code means for searching successfully locates the existing cached entry having the lower quality of service level; and computer-readable program code means for not overwriting the existing cached entry otherwise.

5. The computer program product according to claim 4, wherein the computer-readable program code means for overwriting the existing cached entry further comprises computer-readable program code means for writing the quality of service level of the generated content into the cache store.

6. The computer program product according to claim 4, wherein the cached entry, the requested content, and the generated content are Web pages.

7. A system for selectively replacing cached content in a computing environment, comprising:

means for searching a cache to determine whether a cached entry exists having a lower quality of service level than an entry to be cached, wherein a first quality of service level associated with the cached entry is either a default quality of service or is determined according to a client or client group for which the cached entry was cached, and a second quality of service level associated with the entry to be cached is determined according to the client or client group for which the entry to be cached was created, and wherein the means for searching compares the first quality of service level and the second quality of service level; and means for overwriting the existing cached entry with the entry to be cached, when the means for searching successfully locates the existing cached entry having the lower quality of service level, and for discarding the entry to be cached when the means for searching does not successfully locate the existing cached entry having the lower quality of service level.

8. The system according to claim 7, wherein the cached entry and the entry to be cached are Web pages.

9. The system according to claim 7, wherein the first quality of service level is stored as an attribute of the cached entry, and the second quality of service level is an attribute of the entry to be cached.

10. A system for providing improved delivery of cached content to clients in a computing environment, comprising:

means for receiving a request for content from a client;

means for determining whether a cached version of the requested content exists in a cache store which can be used for responding to the received request, and for returning the requested content to the client if so; and means for generating the requested content, and for returning the generated content to the client and attempting to cache the generated content in the cache store for future use otherwise, further comprising:

means for searching the cache store to determine whether a cached entry exists having a lower quality of service level than the quality of service level of the generated content, wherein values of the quality of service levels are determined by a service provider, based upon fees paid by clients to the service provider;

means for overwriting the existing cached entry with the entry to be cached, when the means for searching successfully locates the existing cached entry having the lower quality of service level; and means for not overwriting the existing cached entry otherwise.

11. The system according to claim 10, wherein the means for overwriting the existing cached entry further comprises means for writing the quality of service level of the generated content into the cache store.

12. The system according to claim 10, wherein the cached entry, the requested content, and the generated content are Web pages.

13. A method of selectively replacing cached content in a computing environment, comprising the steps of:

searching a cache to determine whether a cached entry exists having a lower quality of service level than an entry to be cached, wherein a first quality of service level associated with the cached entry is either a default quality of service level or is determined according to a client or client group for which the cached entry was cached, and a second quality of service level associated with the entry to be cached is determined according to the client or client group for which the entry to be cached was created, and wherein the searching step compares the first quality of service level and the second quality of service level;

overwriting the existing cached entry with the entry to be cached, when the searching step successfully locates the existing cached entry having the lower quality of service level; and discarding the entry to be cached when the searching step does not successfully locate the existing cached entry having the lower quality of service level.

14. The method according to claim 13, wherein the first quality of service level is stored as an attribute of the cached entry, and the second quality of service level is an attribute of the entry to be cached.

15. The method according to claim 13, wherein the cached entry and the entry to be cached are Web pages.

16. A method of providing improved delivery of cached content to clients in a computing environment, comprising the steps of:

receiving a request for content from a client;

determined whether a cached version of the requested content exist in a cache store which can be used for responding to the received request, and returning the requested content to the client if so; and generating the requested content, and returning the generated content to the client and attempting to cache the generated content in the cache store for future use otherwise, further comprising the steps of:

searching the cache store to determine whether a cached entry exists having a lower quality of service level than the quality of service level of the genes content, wherein values of the quality of service levels are determined by a service provider, based upon fees paid by clients to the service provider;

overwriting the existing cached entry with the entry to be cached, when the searching step successfully locates the existing cached entry having the lower quality of service level; and not overwriting the existing cached entry otherwise.

17. The method according to claim 16, wherein the step of overwriting the existing cached entry further comprises the step of writing the quality of service level of the generated content into the cache store.

18. The method according to claim 16, wherein the cached entry, the requested content, and the generated content are Web pages.

19. A method of doing business by providing customer-based selective cache content replacement, further comprising the steps of:

providing one or more enhanced quality of service levels to customers of a service provider;

charging the customers a fee for the enhanced quality of service levels; and providing selective replacement of cached content for the customers who pay the charged fee, further comprising the steps of:

searching a cache to determine whether a cached entry exists having a lower quality of service level than an entry to be cached, wherein:

values of the quality of service levels are determined by the service provider, based upon the fees paid by the customers;

a first quality of service level is associated with a first client or client group for which the cached entry was cached, or is a default quality of service level;

a second quality of service level is associated with a second client or client group for which the entry to be cached was created; and the searching step compares the first quality of service level and the second quality of service level;

overwriting the existing cached entry with the entry to be cached, when the searching step successfully locates the existing cached entry having the lower quality of service level; and discarding the entry to be cached, when the searching step does not successfully locate the existing cached entry having the lower quality of service level.

20. A method of selectively replacing cached content in a computing environment, comprising the steps of:

searching a cache to determine whether a cached entry exists having a lower quality of service level than an entry to be cached;

overwriting the existing cached entry with the entry to be cached, when the searching step successfully locates the existing cached entry having the lower quality of service level; and discarding the entry to be cached when the searching step does not successfully locate the existing cached entry having the lower quality of service level.

21. A method of providing improved delivery of cached content to clients in a computing environment, comprising the steps of:

receiving a request for content from a client;

determining whether a cached version of the requested content exists in a cache store which can be used for responding to the received request, and returning the requested content to the client if so; and generating the requested content, and returning the generated content to the client and attempting to cache the generated content in the cache store for future use otherwise, further comprising the steps of:

searching the cache store to determine whether a cached entry exists having a lower quality of service level than the quality of service level of the generated content;

overwriting the existing cached entry with the entry to be cached, when the searching step successfully locates the existing cached entry having the lower quality of service level; and not overwriting the existing cached entry otherwise.

* * * * *